April 30, 1968     D. L. OFFENBACKER     3,380,775

SAFETY CAR SEAT FOR CHILDREN

Filed Sept. 7, 1966

INVENTOR.

Donald L. Offenbacker

United States Patent Office 3,380,775
Patented Apr. 30, 1968

3,380,775
SAFETY CAR SEAT FOR CHILDREN
Donald L. Offenbacker, 318 Joan Vista,
El Sobrante, Calif. 94803
Filed Sept. 7, 1966, Ser. No. 577,730
5 Claims. (Cl. 297—385)

ABSTRACT OF THE DISCLOSURE

This specification discloses an elevated bench type seat removably placed on a standard automobile seat including a horizontal seat member, a vertical support member and at least a pair of horizontally disposed frame members having spaced apart holes. The holes admit releasable fastening members which are attached to the floor of an automobile. The seat may be easily detached for seating of adults. When installed the children occupants may use the standard seat belts while elevated for ease in seeing through the automobile windows.

---

This invention relates to safety devices, and more particularly a safety bench type car seat for one or more children.

It is therefore the main purpose of this invention to provide a safety car seat for children which is designed to prevent the child or children from being thrown from the seat of an automobile.

Another object of this invention is to provide a safety car seat for children which, in addition to the safety measures, will provide elevated means so that a child or children will be in a position to see out of the windows of the automobile.

Another object of this invention is to provide a safety car seat for children which is inexpensive to manufacture, is of rigid construction, increases the safety factor, and provides maximum riding comfort to its user.

Other objects and advantages of this invention will become apparent from a consideration of the following detailed description taken in connection with the accompanying drawing, wherein a satisfactory embodiment of the invention is shown. However, it is to be understood that the invention is not limited to the details disclosed but includes all such variations and modifications as fall within the spirit of the invention and the scope of the appended claims.

Figure 1:
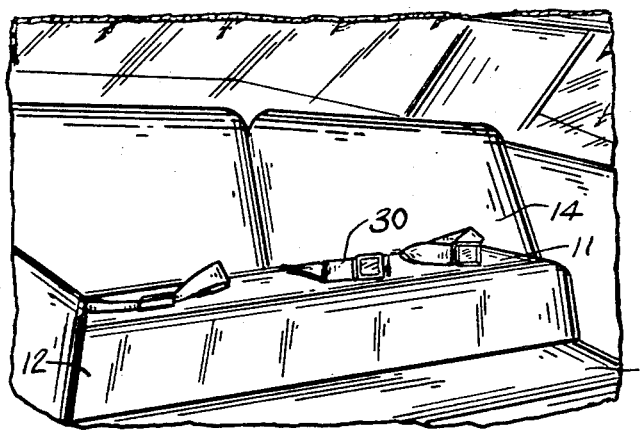
FIGURE 1 is a perspective view of this invention removably secured on a seat of an automotive vehicle.

This invention consists briefly of a first elongated resilient member 11, a second elongated member 12 perpendicularly secured to one side of said first member, the free side of said first member being provided with an outwardly extending flange 12 for abutting said first member against the back rest 14 of an automobile seat, the free side of said second member being provided with an inwardly extending flange 15 for positioning and supporting said first and second members on said automobile seat, a pair of perpendicularly disposed horizontally spaced support plates 17 enclosed and secured within said first and second members, said support plates each having a pair of spaced apart first and second holes 18, said first holes being positioned near said first free side of said first member and said second holes being near said free side of said second member, flexible securing means 20, a plate and hook arrangement 28 secured on the floor 27 of said automobile near the rear portion of said back rest, said securing means being removably affixed to said arrangement and said holes of said support plate, a seat belt member 30 secured to said plate and hook arrangement for providing securing means for a person seated on said safety seat.

According to this invention, a safety car seat 10 is provided with a horizontal seat member 11 which is integrally secured to the vertically disposed support member 12. The elongated panel-like member 11, at its free side, is provided with an outwardly extending semi-circular flange 13 which is adapted to firmly abut the back rest 14 of an automobile seat 16. The free end of vertically disposed member 12 is provided with an inverted flange member 15 which provides support means to the car seat 10. The interior portion of seat 10 is provided with a pair of perpendicularly extending horizontally disposed frame members 17 having a pair of spaced apart holes 18 which are adapted to admit hooks 19 and 21 of their respective, flexible chains 20 and 22. The free ends of chains 20 and 22 are suitably secured on a hook member 28 of a vertically disposed plate 26 which, in turn, is secured to the floor of an automobile. Plate 26 is positioned on floor 27 in such a manner that it is, at all times, adjacent to the rear portion of seat 16.

Figures 2, 3:
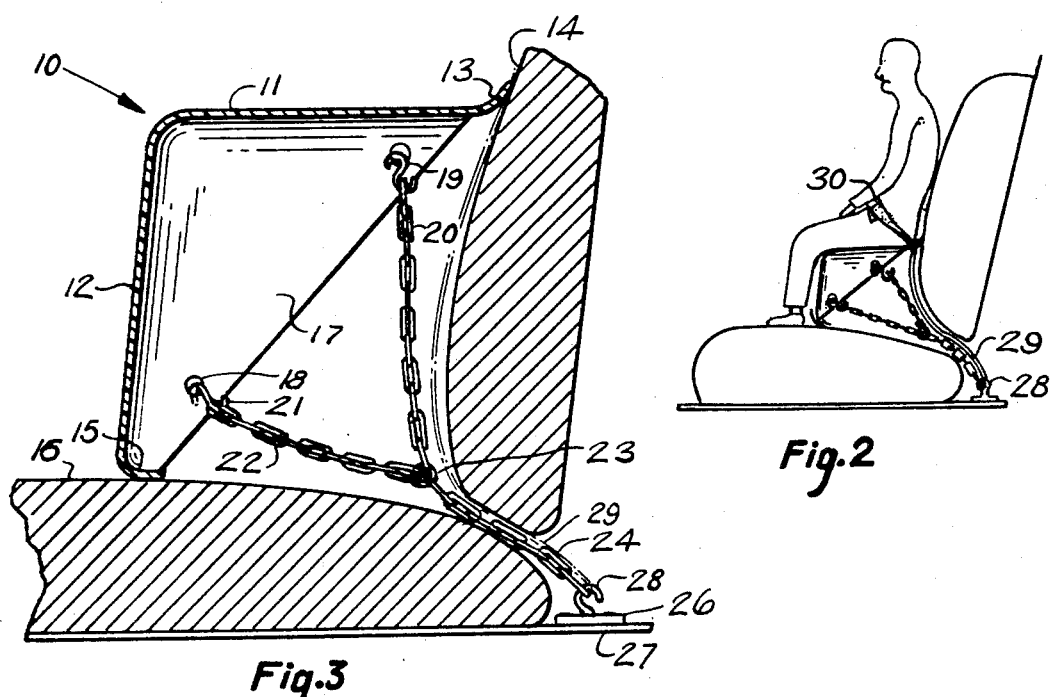
FIGURE 2 is a side view of this invention shown in its operative use.
FIGURE 3 is an enlarged sectional view of this invention.
Figure 4:
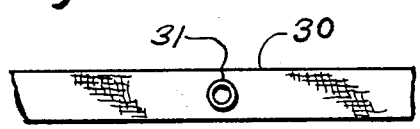
FIGURE 4 is a fragmentary view of a safety belt used within the auspices of this invention.

Looking now at FIGURE 2 of the drawing, one will see that hook 28 also serves as a supporting means for at least one seat belt 30. In this manner an adult-type safety belt may be also used for children seated on the seat member 11.

What I now claim is:

1. A safety car seat for children comprising, in combination, a first elongated resilient member, a second elongated member, perpendicularly secured to one side of said first member, the free side of said first member being provided with an outwardly extending flange for abutting said first member against the back rest of an automobile seat, the free side of said second member being provided with an inwardly extending flange for positioning and supporting said first and second members on said automobile seat, a pair of perpendicularly disposed horizontally spaced support plates enclosed and secured within said first and second members, said support plates each having a pair of spaced apart first and second holes, said first holes being positioned near said first free side of said member and said second holes being near said free side of said second member, flexible securing means, a plate and hook arrangement secured on the floor of said automobile near the rear portion of said back rest, said securing means being removably affixed to said arrangement and said holes of said support plate, a seat belt member, secured to said plate and hook arrangement for providing securing means for a person seated on said safety seat.

2. The combination according to claim 1, wherein said first and second elongated members each are of rectangular configuration and adapted to be snugly positioned within the side portions of an automobile.

3. The combination according to claim 1, wherein said flexible securing means include a chain having secured to hole near said first member, another chain having a hook secured to the hole near said second member, a ring member securing said ring to said plate and hook arrangement.

4. The combination according to claim 1, wherein said first and second members are made of lightweight material moulded in one piece of plastic substance.

5. The combination according to claim 1, wherein at least one eyelet member is secured within said belt for snappingly affixing said chains to said seat belt.

References Cited

UNITED STATES PATENTS

| | | |
|---|---|---|
| 2,777,502 | 1/1957 | Travis. |
| 2,988,135 | 6/1961 | Camimti. |
| 3,136,579 | 6/1964 | Hunter. |
| 3,186,762 | 6/1965 | Lucas. |
| 3,220,769 | 11/1965 | Regan. |
| 3,232,665 | 2/1966 | Von Wimmersperg. |
| 3,265,439 | 8/1966 | McEwen. |

JAMES T. McCALL, *Primary Examiner.*